United States Patent
Kitamura et al.

(10) Patent No.: US 6,953,407 B2
(45) Date of Patent: Oct. 11, 2005

(54) BELT TRANSMISSION APPARATUS

(75) Inventors: Yutaka Kitamura, Tokyo (JP); Youji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,090

(22) Filed: Oct. 23, 2001

(65) Prior Publication Data

US 2002/0052260 A1 May 2, 2002

(30) Foreign Application Priority Data

Oct. 31, 2000 (JP) ........................................ 2000-333094

(51) Int. Cl.$^7$ ................................................. F16H 7/08
(52) U.S. Cl. ........................ 474/135; 474/109; 474/110
(58) Field of Search ................................ 474/101–104, 474/106, 109, 110, 112, 123, 135, 136

(56) References Cited

U.S. PATENT DOCUMENTS

| | | | |
|---|---|---|---|
| 4,300,890 A | | 11/1981 | Hallmann et al. |
| 4,454,236 A | * | 6/1984 | Foster et al. ................ 474/135 |
| 4,478,595 A | * | 10/1984 | Hayakawa et al. ......... 474/109 |
| 4,533,341 A | * | 8/1985 | Yokota ........................ 474/109 |
| 4,758,208 A | * | 7/1988 | Bartos et al. ............... 474/135 |
| 5,176,581 A | * | 1/1993 | Kumm ........................ 474/110 |
| 5,273,494 A | * | 12/1993 | Varin ......................... 474/110 |
| 5,606,941 A | * | 3/1997 | Trzmiel et al. ............ 474/110 |
| 5,733,214 A | * | 3/1998 | Shiki et al. ................. 474/69 |

FOREIGN PATENT DOCUMENTS

| | | |
|---|---|---|
| DE | 26 31 459 A1 | 11/1977 |
| DE | 41 14 716 A1 | 11/1992 |
| DE | 43 33 567 A1 | 4/1995 |
| DE | 196 04 182 A1 | 9/1996 |
| DE | 198 49 659 A1 | 5/2000 |
| DE | 198 49 886 A1 | 5/2000 |
| JP | S57-161344 | 10/1982 |
| JP | S59-107357 | 7/1984 |
| JP | S60-19850 | 2/1985 |
| JP | 05018447 A * | 1/1993 ............. F16H/7/12 |
| JP | H7-54561 | 12/1995 |
| JP | H8-210447 | 8/1996 |
| JP | H08-326853 | 12/1996 |
| JP | H09-280331 A | 10/1997 |
| JP | H11-190222 | 7/1999 |
| JP | 11-190222 | 7/1999 |
| WO | WO 00/00756 A1 | 1/2000 |
| WO | WO 00 26560 A1 | 5/2000 |

* cited by examiner

*Primary Examiner*—Marcus Charles
(74) *Attorney, Agent, or Firm*—Sughrue Mion, PLLC

(57) ABSTRACT

A belt transmission apparatus capable of changing a tension of a belt by the action of belt tension adjuster 9, 30 from a first optimal value of higher tension suitable for the starting of engine 1 to a second optimal value of lower tension suitable for driving an accessory after engine 1 has been started. The belt transmission apparatus includes a rotating electric machine pulley 8 of a rotating electric machine for transmitting starting power to engine 1; engine pulley 2 for transmitting starting power to engine 1 and rotation power of engine 1 to accessories; auxiliary pulleys 3, 4, 5 rotated by the power from engine pulley 2 to drive the accessories belt 10 wrapped around rotating electric machine pulley 8, engine pulley 2 and auxiliary pulleys 3, 4, 5: and belt tension adjuster 9, 30 for urging belt 10 to set tension in a plurality of stages.

23 Claims, 7 Drawing Sheets

BELT TRANSMISSION APPARATUS

This application is based on Application No. 2000-333094, filed in Japan on Oct. 31, 2000, the contents of which are hereby incorporated by reference.

BACKGROUND OF THE INVENTION

1. Field of the Invention

The present invention relates to a belt transmission apparatus for transmitting a rotating force using a belt when an engine is started, or when an accessory is driven to operate by means of an engine.

2. Description of the Related Art

A typical example of such a belt transmission apparatus is disclosed in Japanese Patent Application Laid-Open No. 8-14145. The belt transmission apparatus disclosed therein includes a crank pulley mounted on a crankshaft of an engine, auxiliary pulleys respectively mounted on accessories arranged around the engine, a starter pulley attached to a starter motor, and a belt arranged to wrap around these pulleys to operatively connect them one another in such a manner that a driving force is transmitted from the starter motor through the belt to the engine to start it during engine starting, whereas a driving force is transmitted from the engine through the belt to the respective accessories to drive them after the engine has been started.

As a large transmission torque is required when the engine is started by the conventional starter motor through the belt, it is necessary to apply a high tension to the belt, but in this case, there arises a problem in that the belt is continuously subjected to the high tension unnecessarily even after the engine has been started, thus resulting in a remarkable reduction in the usable service life of the belt.

Moreover, in cases where the high tension is applied to the pulleys mounted on the accessories, there also arises another problem in that it is necessary to increase the strength of the shaft and bearings supporting the pulleys of the accessories, as well as the strength of the support structures therefor, thus increasing the sizes and costs of the accessories.

SUMMARY OF THE INVENTION

The present invention is intended to obviate the various problems as referred to above, and has for its object to provide a belt transmission apparatus which is capable of adjusting a set tension of an automatic belt tensioner to optimal values both at the time of engine starting and when an accessory is driven to operate after an engine has been started.

Bearing the above object in mind, according to the present invention, there is provided a belt transmission apparatus comprising: a rotating electric machine pulley of a rotating electric machine for transmitting starting power to an engine; an engine pulley for transmitting the starting power to the engine and also transmitting a rotation power of the engine to an accessory; an auxiliary pulley being driven to rotate by the power from the engine pulley thereby to drive the accessory; a belt wrapped around the rotating electric machine pulley, the engine pulley and the auxiliary pulley in succession; and a belt tension adjuster for urging the belt so as to set a tension of the belt in a plurality of stages. The tension adjuster acts to adjust the tension of the belt in such a manner that the belt tension is set to be greater when the engine is started by the rotating electric machine than when the accessory is driven to operate after the engine has been started.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
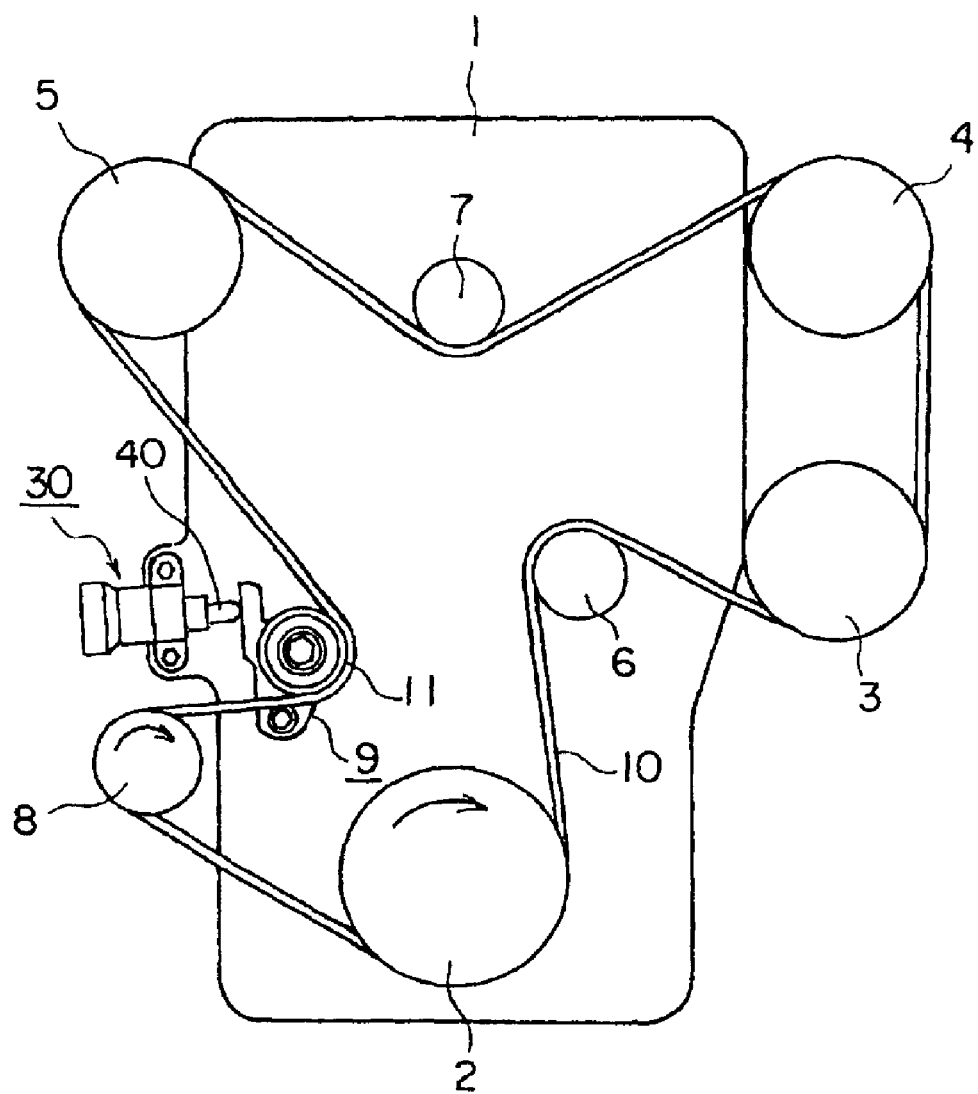
FIG. 1 is a plan view of a belt transmission apparatus according to a first embodiment of the present invention.
Figure 2:
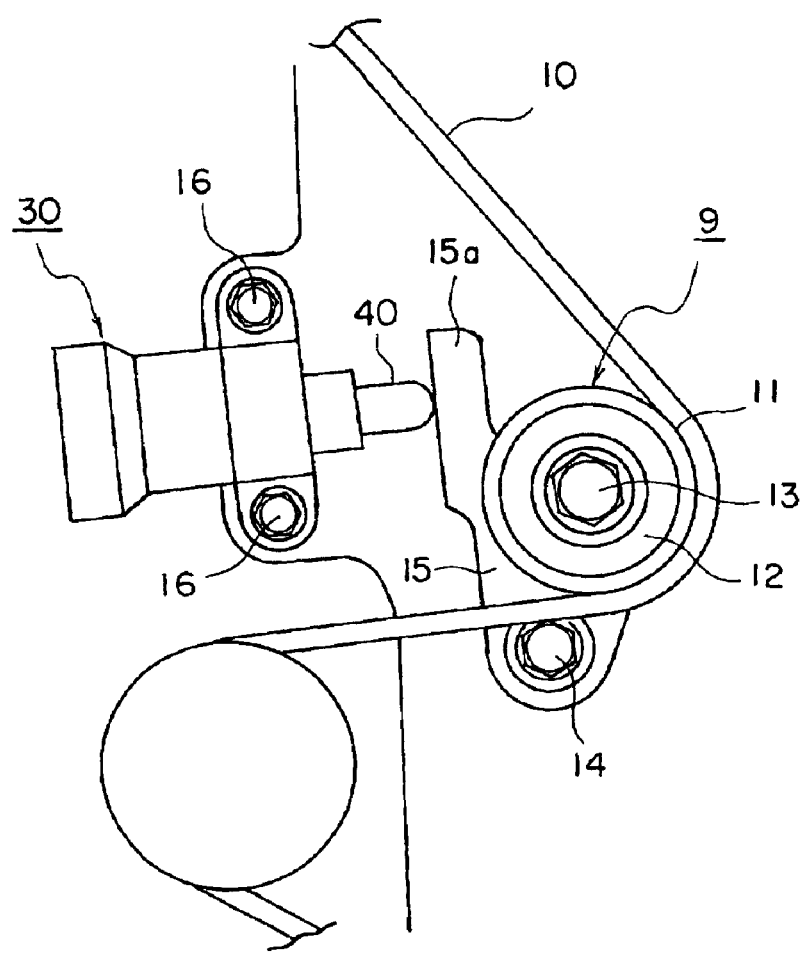
FIG. 2 is an enlarged view of the neighborhoods of an automatic belt tensioner of FIG. 1.
Figure 3:
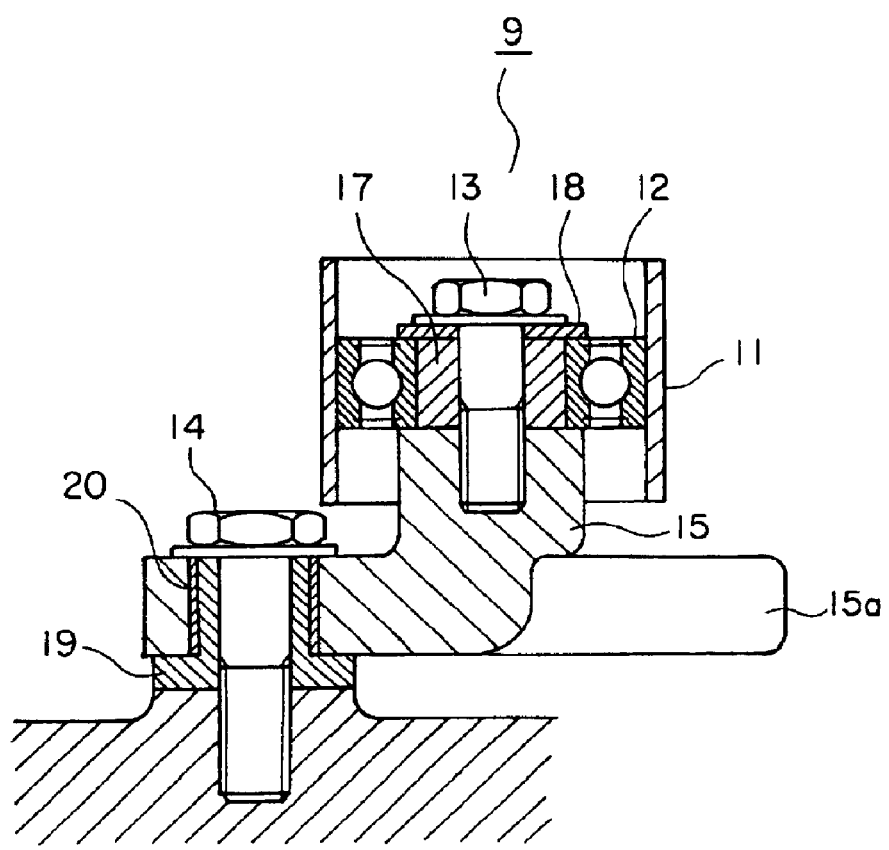
FIG. 3 is a cross sectional view of essential portions of FIG. 2.
Figure 4A:
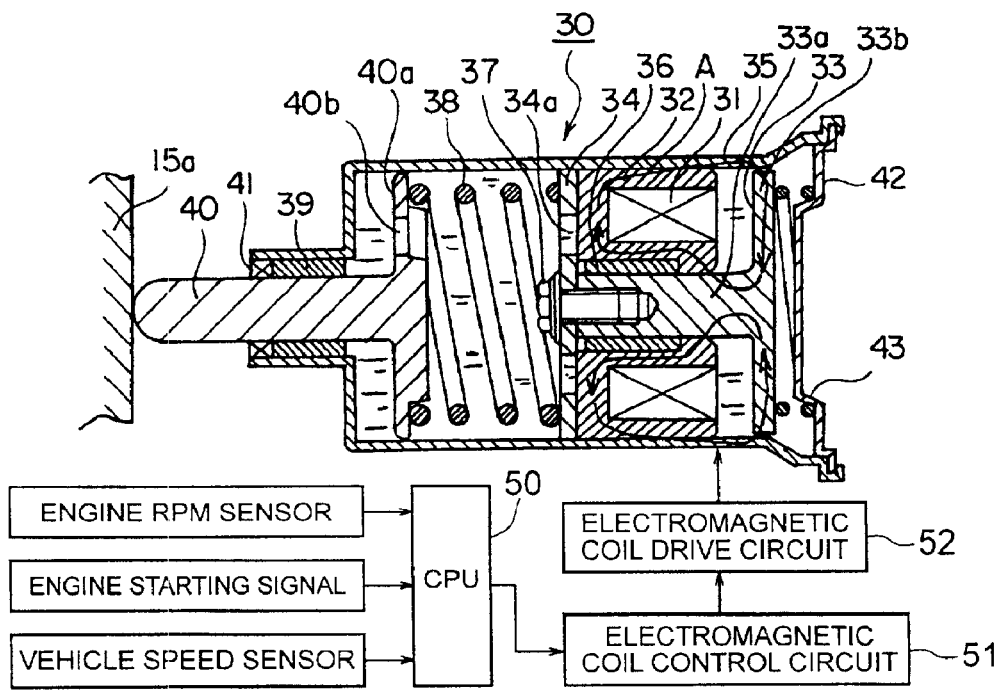
FIG. 4A is a cross sectional view of the automatic belt tensioner when no exciting current is supplied to an electromagnetic coil.
Figure 4B:
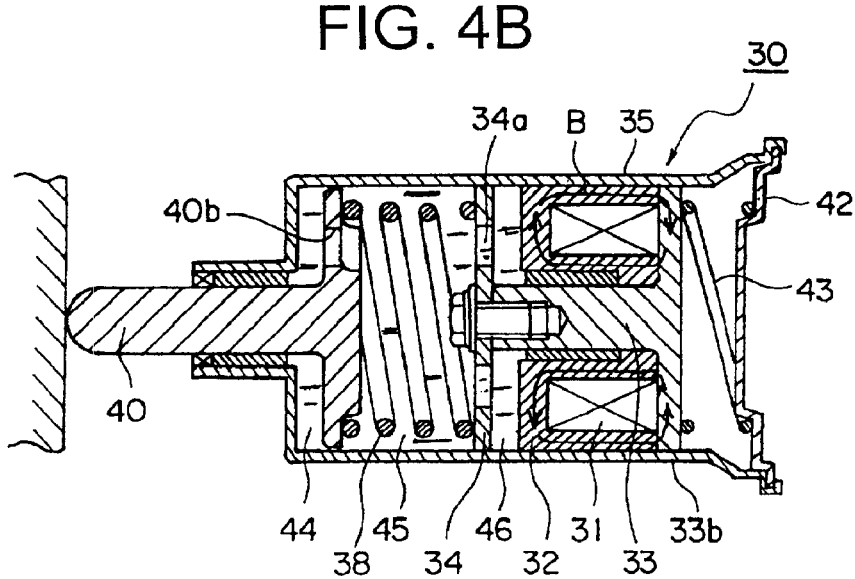
FIG. 4B is a cross sectional view of the automatic belt tensioner when an exciting current is supplied to the electromagnetic coil.

FIG. 1 illustrates, in a plan view, a belt transmission apparatus constructed in accordance a first embodiment of the present invention; FIG. 2 illustrates, in an enlarged view, the neighborhoods of an automatic belt tensioner 30 of FIG. 1; FIG. 3 illustrates, in cross section, essential portions of FIG. 2; FIG. 4A illustrates, in cross section, the automatic belt tensioner 30 when no exciting current is supplied to an electromagnetic coil 31; and FIG. 4B illustrates, in cross section, the automatic belt tensioner 30 when an exciting current is supplied to the electromagnetic coil 31.

The belt transmission apparatus includes an engine pulley in the form of a crank pulley 2 mounted on a crankshaft of an engine 1, auxiliary pulleys 3, 4 and 5 mounted on a first accessory A, a second accessory B and a third accessory C, respectively, fixed tensioner pulleys 6, 7, a rotating electric machine pulley 8 mounted on a rotating electric machine in the form of a starter motor, a pulley unit 9, a single belt 10 which is wrapped around the crank pulley 2, fixed tensioner pulley 6, auxiliary pulley 3, auxiliary pulley 4, fixed tensioner pulley 7, auxiliary pulley 5, pulley unit 9, and rotating electric machine pulley 8 in a clockwise direction in the order as described, and an automatic tensioner 30 for adjusting the tension of the belt 10 in two stages. Here, note that the pulley unit 9 and the automatic belt tensioner 30 together constitute a tension adjuster capable of adjusting the tension of the belt 10 in two stages.

The fixed tensioner pulleys 6 and 7 serve to increase wrapping angles of the belt 10 wrapped around the crank pulley 2 and the auxiliary pulleys 3, 4 and 5 so as to prevent a slip of the belt 10.

Similarly, the pulley unit 9 serves not only to increase the belt wrapping angles of the auxiliary pulley 5 and the rotating electric machine pulley 8 so as prevent an occurrence of belt slipping, but also to keep the tension of the belt 10 at a preset constant tensile force.

The pulley unit 9 includes a cylindrical tension pulley 11 around the outer periphery of which the belt 10 is wrapped, a bearing 12 fitted in and secured to the inner peripheral side of the cylindrical tension pulley 11, a bush 17 press fitted into an inner lace of the bearing 12, a plate 18 abutting against the bearing 12 and the bush 17, an arm 15 abutting against the bearing 12 and the bush 17, and bolts 14 by which the arm 15 is mounted on the engine 1 for swinging movement through a liner 20 and a fulcrum bush 19. The tension pulley 11 is rotatable coaxially with the bush 17 or bolt 13 under the action of the bearing 12.

A flange 15a, part of the arm 15, is abutted against a push rod 40 of the automatic belt tensioner 30 so as to be pushed thereby. The automatic belt tensioner 30 is fixed to the engine 1 by means of bolts 16.

In the automatic belt tensioner 30, the electromagnetic coil 31 is held internally of an electromagnetic core 32, the outer peripheral portion of which is fitted in and fixed to the inner peripheral portion of a housing 35 of a magnetic material. A slide bearing 36 is fitted in and fixed to the inner peripheral portion of the electromagnetic core 32. A movable electromagnetic core 33 has an axial core portion 33a inserted into the slide bearing 36 for axial movement relative thereto. The axial core portion 33a faces a part of the inner peripheral surface of the electromagnetic core 32 with a slight gap therebetween to form a part of a magnetic circuit. In addition, the movable electromagnetic core 33 has a core plate 33b which faces the inner peripheral surface of the housing 35 with a slight gap therebetween to form a part of the magnetic circuit. A plate 34 of a non-magnetic material is fixedly fastened to an end face of the axial core portion 33a opposite the core plate 33b by means of bolts 37.

A first spring 38 of an elastic material is disposed between the plate 34 and the push rod 40 for urging the push rod 40 toward the flange 15a. The push rod 40 is slidably inserted into a slide bearing 39 and a seal 41, which are fixedly fitted into the housing 35, for axial sliding movement relative thereto.

A cover plate 42 is fitted into the housing 35 for holding a second spring 43. The second spring 43 serves to urge the core plate 33b in a direction toward the electromagnetic core 32.

The spaces defined in the housing 35 by the push rod 40, the plate 34 and the electromagnetic core 32 are sequentially called a first chamber 44, a second chamber 45 and a third chamber 46, respectively, from the side of the push rod 40, with a high-viscosity fluid such as silicone oil being filled into the respective chambers. The first chamber 44 and the second chamber 45 are in communication with each other by a through hole 40b formed through a disk portion 40a of the push rod 40, and the second chamber 45 and the third chamber 46 are in communication with each other by a through hole 34a formed through the plate 34. The size and number of through holes 40b and 34a can be changed in accordance with the target operating characteristics of the automatic belt tensioner of variable tension.

The electromagnetic coil 31 is controllably supplied with electric power under the control of a central processing unit (CPU) 50 through an electromagnetic coil control circuit 51 and an electromagnetic coil drive circuit 52.

Here, it is to be noted that the component elements of the automatic belt tensioner 30 other than the spring 38 of an elastic material, the push rod 40, the slide bearing 39 and the seal 41 constitute an elastic deformation unit for elastically deform the spring 38.

Next, reference will be made to the operation of the belt transmission apparatus as constructed above.

Referring again to FIG. 1, when the engine 1 is started from a standstill, the rotating electric machine pulley 8 is driven to rotate in a clockwise direction by means of the starter motor, so that the rotational driving force of the rotating electric machine pulley 8 is transmitted to the crank pulley 2 through the belt 10, thereby rotating the crank pulley 2 to start the engine 1. At this time, it is necessary to transmit a large transmission torque from the rotating electric machine pulley 8 to the crank pulley 2 through the belt 10 without causing a belt slip. To this end, the tension of the belt 10 is switched in advance to a high set value before engine starting by the pulley unit 9 and the automatic belt tensioner 30 which is arranged in a most belt-slackening area between the rotating electric machine pulley 8 and the auxiliary pulley 5 of the accessory C.

After the engine 1 has been started, the set tension is switched or changed by the pulley unit 9 and the automatic belt tensioner 30 to an ordinary tension of the belt 10 suitable when the accessory is driven.

The switching of the set tension of the belt 10 is controlled as follows. First of all, external signals such as an engine rpm signal, an engine starting signal, a vehicle speed signal, a brake pedal position signal (not shown), an accelerator pedal position signal (not shown),a belt tension value signal (not shown), etc., are input to the CPU 50. The CPU 50 performs signal processing and arithmetic processing on the signals thus input, and outputs a control signal to the electromagnetic coil control circuit 51. Then, an electromagnetic coil control signal is sent from the electromagnetic coil control circuit 51 to the electromagnetic coil drive circuit 52, which in turn controls electric power to be supplied to the electromagnetic coil 31 based on the control signal.

Next, reference will be made to the operations of the pulley unit 9 and the automatic belt tensioner 30.

First of all, in FIG. 2 and FIG. 3, the push rod 40 of the automatic belt tensioner 30 pushes the flange 15a of the pulley unit 9 by a set pushing force, whereby the tension pulley 11 is caused to turn clockwise around the fulcrum bush 19 to push the belt 10 to the right in FIG. 2, thereby adjusting the tension of the belt 10.

FIG. 4A illustrates an internal state of the automatic belt tensioner 30 at the time when no power is supplied to the electromagnetic coil 31 (e.g., when the accessories are driven), in which the plate 34 is pushed back to a left-hand end face of the electromagnetic core 32 under the resilient force of the first spring 38 and hence the rate of compression of the first spring 38 is small, thus exerting a limited urging force on the push rod 40 as a reactive force. This corresponds to the state where the belt tension is set to an ordinary value at the time when an accessory is driven to operate.

On the other hand, FIG. 4B illustrates an internal state of the automatic belt tensioner 30 at the time when power is supplied to the electromagnetic coil 31 (e.g., at the time of engine starting), in which the core plate 33b of the movable electromagnetic core 33 is drawn to move to the left in FIG. 4A under the electromagnetic attraction of the electromagnetic coil 31, whereby it is attracted and attached to a right-hand end face of the electromagnetic core 32. In accordance with this movement, the plate 34 is caused to move to the left to compress the first spring 38, thus generating a large pushing force on the push rod 40 as a reactive force. As a result, the force of the pulley unit 9 pushing the flange 15a becomes greater, so that the tension pulley 11 of FIG. 2 is caused to further turn clockwise around the fulcrum bush 19, thus increasing the tension of the belt 10.

In the process of the above-mentioned operation in FIGS. 4(a) and 4(b), the high-viscosity fluid filled in the first, second and third chambers 44, 45 and 46 moves into or out of these chambers via the through holes 40b, 34a in the disk portion 40a and the plate 34 as the push rod 40 moves to the right or left. Thus, these chambers also have the function of a buffer.

With this buffering or cushioning function, it is possible to avoid the trouble of the first spring 38 being caused to resonate by a force applied thereto due to a variation in the tension of the belt 10 and the frequency of the variation through the push rod 40.

Here, note that arrow A in FIG. 4A represents the flow of a magnetic flux immediately after the electromagnetic coil 31 has been energized or supplied with electric power from its deenergized state, and arrow B in FIG. 4B represents the flow of a magnetic flux when the core plate 33b of the movable electromagnetic core 33 is attracted and attached to the electromagnetic core 32.

With the belt transmission apparatus as constructed above, the tension of the belt 10 is increased only when the transmission of a high torque is required during engine starting, and after the engine has been started, the tension of the belt 10 is returned to an initial value ordinarily suitable for driving the accessories, as a result of which adverse effects on the accessories can be suppressed to a minimum without reducing the lifetime of the belt 10.

Embodiment 2

Figure 5:
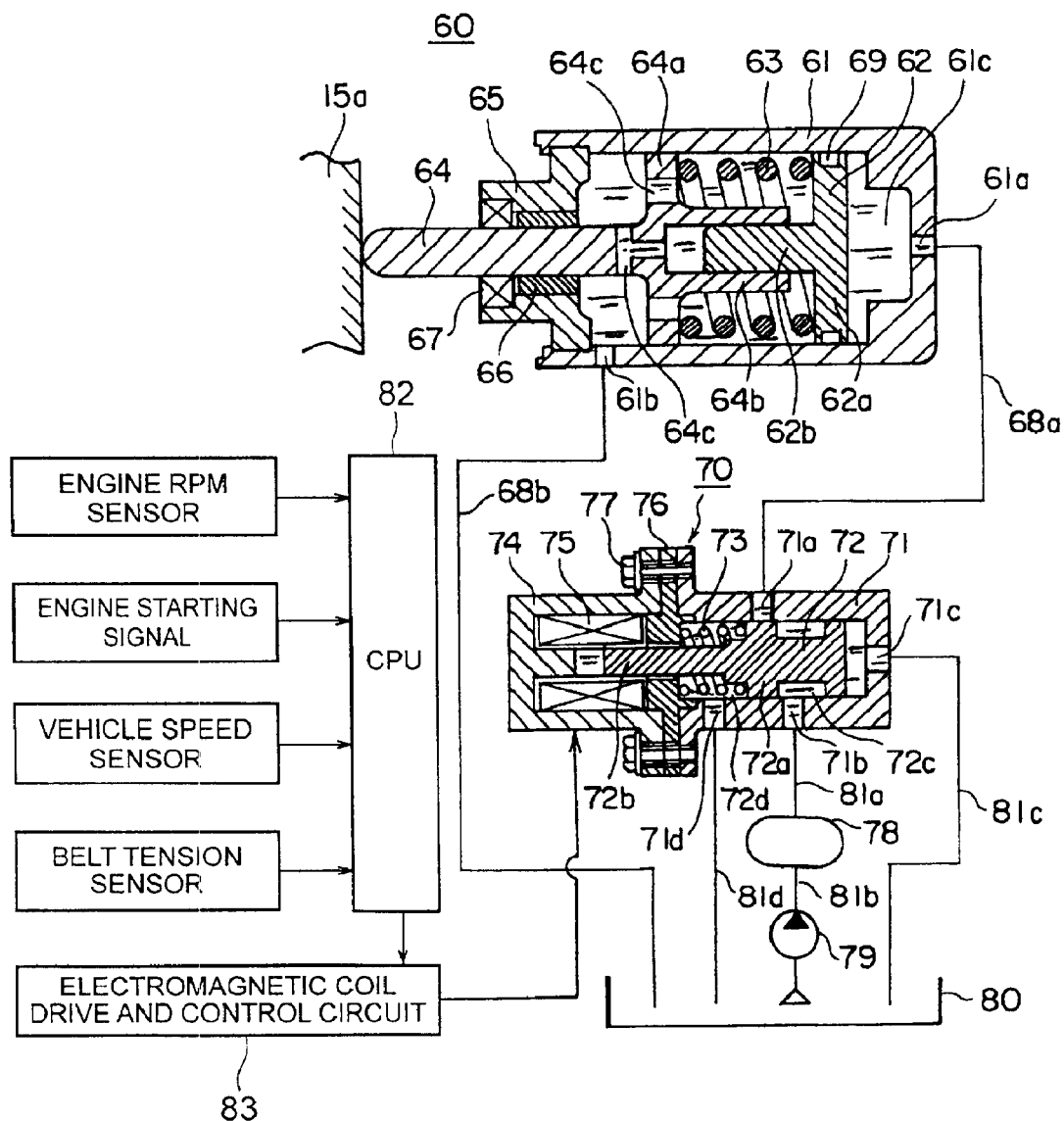
FIG. 5 is a cross sectional view of an automatic belt tensioner of a belt transmission apparatus according to a second embodiment of the present invention.

FIG. 5 is a cross sectional view of an automatic belt tensioner 60 of a belt transmission apparatus according to a second embodiment of the present invention. Since the construction of this embodiment other than the automatic belt tensioner 60 is the same as that of the first embodiment, a description thereof is omitted here.

The automatic belt tensioner 60 includes a cylindrical housing 61, a piston 62 with a disk portion 62a and a rod portion 62b, a spring 63, and a push rod 64 with a disk portion 64a and a cylindrical portion 64b, and a control unit 70. The piston 62, the spring 63 and the push rod 64 are all accommodated in the cylindrical housing 61.

The spring 63 is clamped between the disk portion 62a of the piston 62 and the disk portion 64a of the push rod 64 so that it is compressed and expanded as the rod portion 62b of the piston 62 moves in an axial direction within an inner cylindrical bore in the cylindrical portion 64b of the push rod 64. Here, note that a seal ring 69 is provided between the outer peripheral surface of the disk portion 62a and the inner peripheral surface of the cylindrical housing 61. A cover housing 65 is fixedly secured to an end face of the cylindrical housing 61 near the push rod 64 in a fluid tight manner, and a slide bearing 66 and a seal 67 are fitted in and fixed to the inner side of the cover housing 65.

The push rod 64 is movable in the axial direction through the slide bearing 66 and the seal 67 in a fluid tight manner. A supply and discharge port 61a for pressure oil is formed through the bottom of the cylindrical housing 61 near the piston 62, and a drain port 61b is formed through a side surface of the cylindrical housing 61 near the cover housing 65. Pipes or conduits 68a, 68b are connected with the ports 61a, 61b, respectively. A pressure oil chamber 61c is defined in the cylindrical housing 61 by the piston 62, and pressure oil is supplied from a hydraulic pump to the pressure oil chamber 61c.

In a control valve unit 70, which is a component of the automatic belt tensioner 60, a spool 72 is received within the inner periphery of a spool valve housing 71 for axial sliding movement and is urged to the right in FIG. 5 by means of a spring 73. An electromagnetic core plate 76, which forms a magnetic circuit together with an electromagnetic core 74 holding therein an electromagnetic coil 75, is clamped between and fixed to the electromagnetic core 74 and the spool valve housing 71 by means of bolts 77.

The electromagnetic coil 75 is controlled to be driven or energized by a CPU 82 through an electromagnetic coil drive and control circuit 83.

The spool valve housing 71 is formed with an inflow and outflow port 71a, a pump port 71b, a drain port 71c and an outlet port 71d, and pipes 68a, 81a, 81c and 81d are connected at their one end with these ports 71a, 71b, 71c and 71d, respectively. The pipes 81c, 81d are directly connected at their other end with a tank 80, and the pipe 81a is connected with the tank 80 by way of a pressure oil tank 78, a pipe 81b and a hydraulic pump 79.

The spool 72 has a rod 72b fitted in an inner bore in the electromagnetic coil 75 and a central bore in the electromagnetic core plate 76 with a slight gap formed therebetween for axial sliding movement relative thereto. The spool 72 also has a land 72a which is in sliding contact with the inner periphery of the spool valve housing 71 in a fluid tight manner for axial sliding movement. The land 72a serves to open or close the inflow and outflow port 71a in accordance with axial movement of the spool 72, whereby the inflow and outflow port 71a is placed into or out of communication with the pump port 71b through a communication chamber 72c. In addition, the land 72a similarly serves to open the inflow and outflow port 71a to place it into fluid communication with the outlet port 71d through a spring chamber 72d.

Here, note that the component elements of the automatic belt tensioner 60 other than the spring 63 of an elastic material, the push rod 64, the slide bearing 66 and the seal 67 constitute an elastic deformation unit for elastically deforming the spring 63.

Next, reference will be made to the operation of the hydraulically operated automatic belt tensioner 60 as constructed above.

In FIG. 5, similar to the first embodiment, upon receipt of various external signals, the CPU 82 generates an instruction signal to the electromagnetic coil drive and control circuit 83, which then controls the supply of electric power to the electromagnetic coil 75 based on the instruction signal.

Specifically, when the electromagnetic coil 75 is energized, the rod 72b is driven to move to the left in FIG. 5 under the electromagnetic attraction force of the electromagnetic coil 75, whereby the inflow and outflow port 71a and the pump port 71b are placed into communication with each other through the communication chamber 72c. As a result, pressure oil from the pressure oil tank 78 flows into the pressure oil chamber 61c by way of the pump port 71b, the communication chamber 72c, the inflow and outflow port 71a, the pipe 68a and the supply and discharge port 61a. Accordingly, the pressure in the pressure oil chamber 61c is increased to move the disk portion 62a of the piston 62 to the left in FIG. 5, so that the spring 63 is compressed to increase the resilient reactive force of the spring 63 which acts to push the disk portion 64a of the push rod 64. As a consequence, the force of the push rod 64 pushing the flange 15a of the pulley unit 9 becomes larger, so that the tension pulley 11 of FIG. 2 is caused to turn clockwise around the fulcrum bush 19 thereby to increase the tension of the belt 10. In this manner, the belt tension is set to a value suitable for engine starting.

Then, when the electromagnetic coil 75 is deenergized, the spool 72 is pushed back to the right by the restoring force of the spring 73, thus placing the inflow and outflow port 71a and the outlet port 71d into communication with each other through the spring chamber 72d. Consequently, the pressure oil in the pressure oil chamber 61c is returned to the tank 80 through the inflow and outflow port 61a, the pipe 68a, the inflow and outflow port 71a, the spring chamber 72d, the outlet port 71d and the pipe 81d, so that the disk portion 62a is pushed back to the right by the resilient reactive force of the spring 63, permitting the spring 63 to expand. Thus, the resilient reactive force of the spring 63 is decreased, reducing the force of the push rod 64 pushing the flange 15a. As a result, the tension pulley 11 of FIG. 2 is pushed back or caused to rotate in an counterclockwise direction around the fulcrum bush 19, returning the tension of the belt 10 to an ordinary value suitable for driving the accessories.

Embodiment 3

Figure 6A:
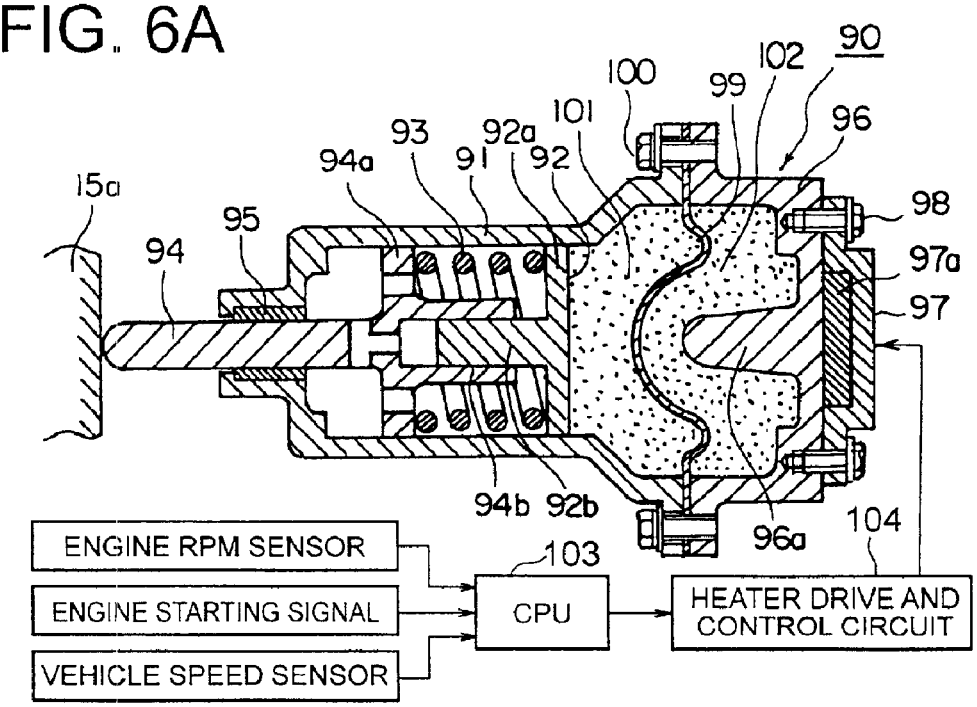
FIGS. 6A and 6B are cross sectional views respectively illustrating different operating states of an automatic belt tensioner of a belt transmission apparatus according to a third embodiment of the present invention.
Figure 6B:
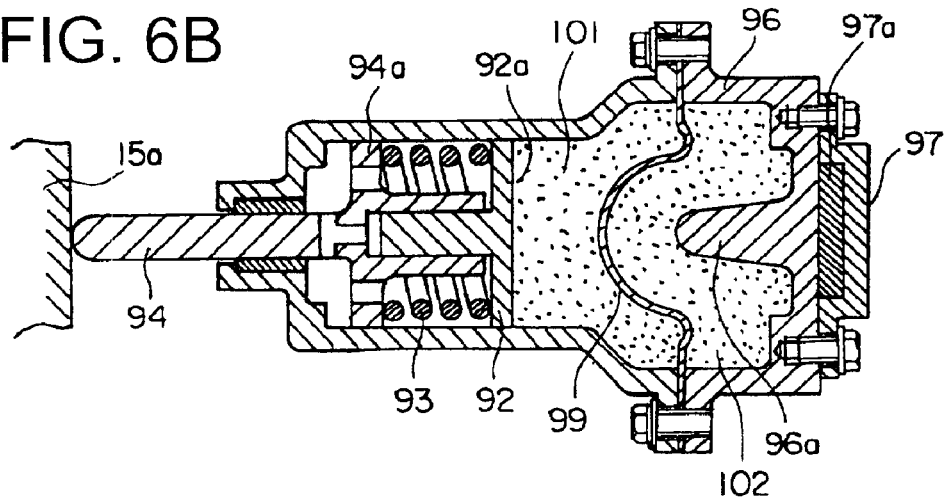

FIGS. 6A and 6B illustrate in cross section an automatic belt tensioner 90 of a belt transmission apparatus according to a third embodiment of the present invention. Since the construction of this embodiment other than the automatic belt tensioner 90 is the same as that of the first embodiment, a description thereof is omitted here.

FIGS. 6A and 6B are cross sectional views illustrating the states of the automatic belt tensioner 90 of the wax expansion type before and after its wax expansion, respectively.

This automatic belt tensioner 90 of the wax expansion type includes a piston 92 with a disk portion 92a and a rod portion 92b, a spring 93, and a push rod 94 with a disk portion 94a and a cylindrical portion 94b, all received in a housing 91. The spring 93 is clamped by the disk portion 92a of the piston 92 and the disk portion 94a of the push rod 94. The spring 93 is compressed and expanded as the rod portion 92b of the piston 92 moves in an axial direction within an inner cylindrical bore in the cylindrical portion 94b of the push rod 94. In addition, a slide bearing 95 is fitted in and fixed to the housing 91 for supporting the push rod 94 in such a manner that the push rod 94 is smoothly movable or slidable in the axial direction through the slide bearing 95.

A wax housing 96 is made of a heat conductive material having a good heat conductivity such as an aluminum alloy for instance. The wax housing 96 is formed at its center with a projection 96a for heat conduction. A heater unit 97 such as, for example, a PTC ceramic heater is fastened and fixed to an end of the wax housing 96 by means of bolts 98 with a heating element 97a being in close contact therewith. A diaphragm 99 is clamped between and fixedly secured to the housing 91 and the wax housing 96 by means of bolts 100.

A diaphragm chamber 101 is defined and surrounded by the disk portion 92a of the piston 92, the housing 91 and the diaphragm 99, and filled with a high-viscosity fluid. A wax chamber 102 is defined and surrounded by the diaphragm 99 and the wax housing 96, and filled with a wax which has a property such that there takes place a volume change of about 20% due to expansion or contraction when the wax is melted by heating or solidified by cooling.

The heater unit 97 is controlled to be driven by a CPU 103 through a heater drive and control circuit 104.

Here, note that the component elements of the automatic belt tensioner 90 other than the spring 93 of an elastic material, the push rod 94 and the slide bearing 95 constitute an elastic deformation unit for elastically deforming the spring 93.

Now, reference will be made of the operation of the automatic belt tensioner 90 of the wax expansion type as constructed above.

Referring again to FIGS. 6A and 6B, similar to the first embodiment 1, when the CPU 103 receives various external signals, it sends out an instruction signal to the heater drive and control circuit 104, which then controls the supply of electric power to the heater unit 97 based on the instruction signal.

FIG. 6B illustrates an internal state of the automatic belt tensioner 90 of the wax expansion type at the time when the heater unit 97 is energized.

Upon energization of the heater unit 97, the heat generated in the heating element 97a is transmitted to the wax housing 96 and thence to the central portion of the wax chamber 102 through the projection 96a in an efficient manner. As a result, the temperature of the wax rises efficiently due to the heat transmitted thereto from the surroundings and the interior of the wax chamber 102. As the wax temperature rises, the volume of the wax increases to swell or deform the diaphragm 99 to the left in FIGS. 6A and 6B, whereby the high-viscosity fluid in the diaphragm chamber 101 causes the disk portion 92a of the piston 92 to move to the left in FIGS. 6A and 6B, thus compressing the spring 93. Accordingly, the resilient reactive force of the spring 93 pushing the disk portion 94a of the push rod 94 is increased, and hence the force of the push rod 94 pushing the flange 15a of the pulley unit 9 also grows greater, so that the tension pulley 11 of FIG. 2 is caused to turn clockwise around the fulcrum bush 19 to increase the tension of the belt 10. In this manner, the tension of the belt 10 is set to a value suitable for starting the engine 1.

At this time, since the heater unit 97 is a PTC ceramic heater whose temperature can be independently controlled to a constant value, it is possible to maintain the degree of expansion of the wax at a constant value, thus permitting the adjustment of the degree of compression of the spring 93. Therefore, the tension of the belt 10 can be adjusted to the set value.

Thereafter, when the heater unit 97 is deenergized, the wax cools down to contract or shrink so that the swelling of the diaphragm 99 disappears as shown in FIGS. 6A, allowing the diaphragm 99 to return to the original state. As a result, the disk portion 92a of the piston 92 is caused to move to the right in FIGS. 6A and 6B, expanding the spring 93 to decrease its resilient reactive force, whereby the force of the push rod 94 pushing the flange 15a becomes small. Thus, the tension pulley 11 of FIG. 2 is pushed back to rotate in an counterclockwise direction, so that the tension of the belt 10 is returned to the ordinary value suitable for driving the accessories.

Embodiment 4

Figure 7:
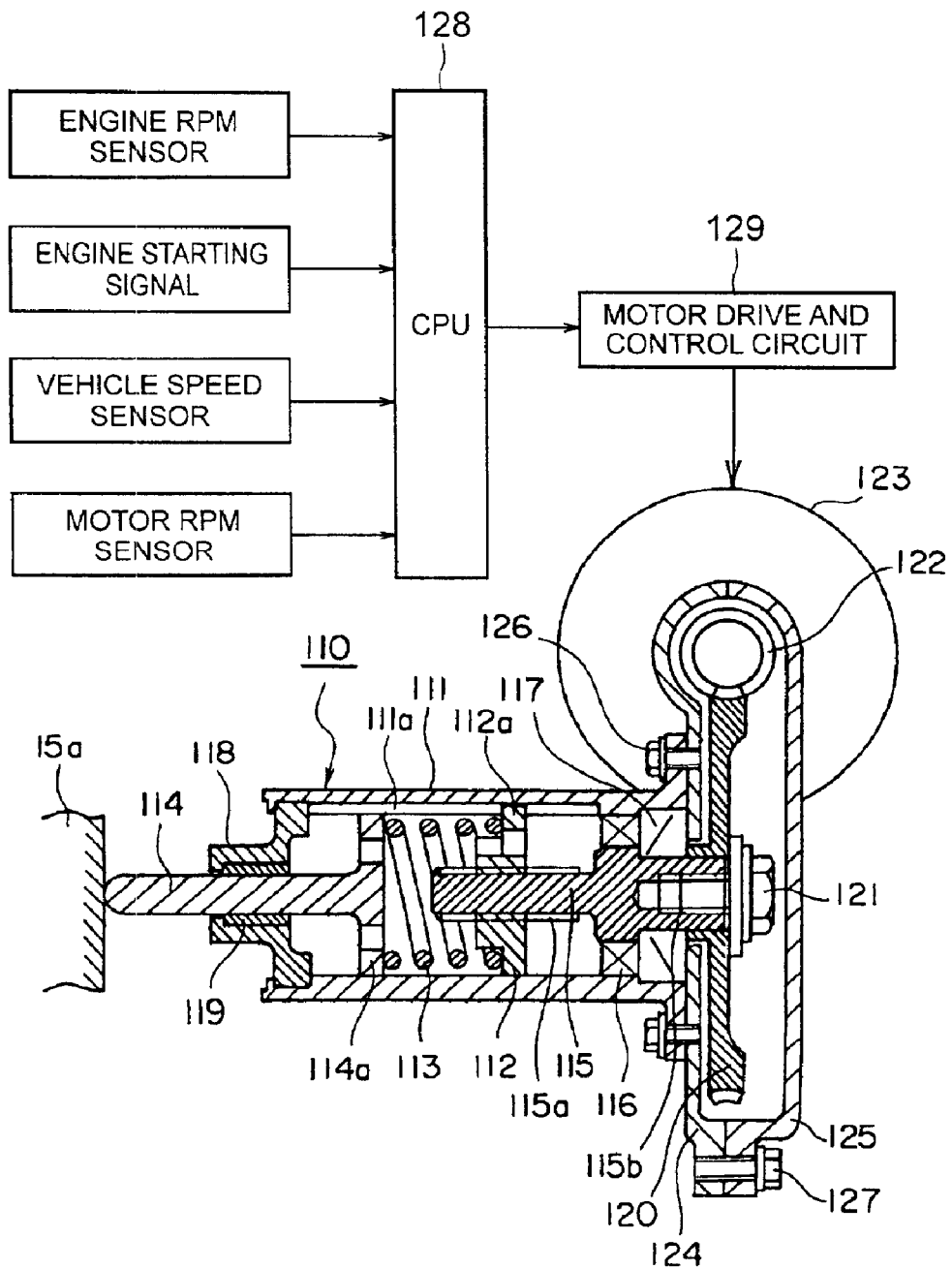
FIG. 7 is a cross sectional view of an automatic belt tensioner of a belt transmission apparatus according to a fourth embodiment of the present invention.

FIG. 7 is a cross sectional view of an automatic belt tensioner 110 of a belt transmission apparatus according to a fourth embodiment of the present invention. Since the construction of this embodiment other than the automatic belt tensioner 110 are the same as that of the first embodiment, a description thereof is omitted here.

The automatic belt tensioner 110 of the worm gear speed-reduction type includes a screw type movable disk 112 having a thread formed at the center thereof, a spring 113, a push rod 114 with a disk portion 114a, a screw type position adjustment shaft 115, a seal 116, and a bearing 117, all accommodated in a housing 111. A cover housing 118, in which a slide bearing 119 is fixedly fitted, is firmly secured to one end of the housing 111 near the push rod 114 in a fluid tight manner. The spring 113 is clamped between the disk portion 114a of push rod 114 and the screw type movable disk 112 in such a manner that it is expandable and contractible in accordance with axial movement of the disk portion 114a or the screw type movable disk 112. Here, note that the push rod 114 is movable fluid-tightly in the axial direction through the slide bearing 119, and the screw type movable disk 112 having a plurality of radial projections 112a is also movable in the axial direction with the projections 112a fitted in and guided along a plurality of corresponding axially extending guide grooves 111a formed on the inner periphery of the housing 111.

A worm wheel 120, which is provided on one side of the screw type position adjustment shaft 115 opposite the thread 115a, is inserted into and fixedly secured to a power transmission shaft portion 115b of the screw type position adjustment shaft 115 by means of the bearing 117 and bolts 121, so that the torque transmitted from the warm 122 to the worm wheel 120 is further transmitted to the screw type position adjustment shaft 115. The warm 122 is provided on one end of a rotating shaft of an electric motor 123 for transmitting the torque generated by the electric motor 123 to the worm wheel 120. Note that the electric motor 123 is controlled by a CPU 128 through an electric motor control and drive circuit 129 in such a manner that it is rotatable both in a clockwise direction and in a counterclockwise direction.

A first worm gear cover 124 is fixedly fastened to the housing 111 by means of bolts 126. A second worm gear cover 125 is fixed integrally with the first worm gear cover 124 by means of bolts 127. These first and second worm gear covers 124, 125 enclose and protect the warm 120 and the worm wheel 122.

Here, note that the component elements of the automatic belt tensioner 110 other than the spring 113 of an elastic material, the push rod 114 and the slide bearing 119 constitute an elastic deformation unit for elastically deforming the spring 113.

Now, reference will be made to the operation of the automatic belt tensioner 110 of the worm gear speed-reduction type.

In FIG. 7, similar to the first embodiment, upon receipt of various external signals, the CPU 128 generates an instruction signal to the electromagnetic coil drive and control circuit 129, which then controls the rotational direction and the number of revolutions of the electric motor 123 based on the instruction signal.

The electric motor 123 is driven to rotate by a predetermined number of revolutions in one rotational direction under the driving control of the motor drive and control circuit 129, so that the rotating force or torque of the electric motor 123 is transmitted from the worm 122 to the worm wheel 120 as an increased torque with the speed of rotation being reduced. In addition, as the threaded portion 115a of the screw type position adjustment shaft 115 is caused to rotate by the rotating force or torque of the worm wheel 120, the screw type movable disk 112 is driven to move to the right or left in FIG. 7 by a predetermined distance in accordance with the rotational direction of the threaded portion 115a.

First, in the case where the screw type movable disk 112 is moved to the left in FIG. 7, the spring 113 is compressed so that the resilient reactive force of the spring 113 pushing the disk portion 114a of the push rod 114 is increased. As a result, the force of the push rod 114 pushing the flange 15a of the pulley unit 9 also increases, causing the tension pulley 11 of FIG. 2 to rotate clockwise around the fulcrum bush 19 to increase the tension of the belt 10. Thus, the tension of the belt 10 is set to a value suitable for starting the engine 1.

On the contrary, in the case where the screw type movable disk 112 is moved to the right in FIG. 7, the spring 113 is permitted to expand, whereby the resilient reactive force of the spring 113 is decreased, reducing the force of the push rod 114 which acts to push the flange 15a. Consequently, the tension pulley 11 of FIG. 2 is pushed back to rotate counterclockwise, thus returning the tension of the belt 10 to the ordinary value suitable for driving the accessories.

With the construction as described above, the resilient reactive force of the spring 113 can be arbitrarily set by controlling the rotational direction and the number of revolutions per unit time of the electric motor 123, so it becomes possible to arbitrarily adjust the tension of the belt 10.

Although in the above-mentioned first to four embodiments, the pulley unit 9 and the automatic belt tensioner of a variable tension are formed separately from each other, it may for instance be constructed such that a set or combination of a tension pulley, a bearing and a bush integrally formed with one another is fixedly mounted on one end of a push rod of an automatic belt tensioner so as to push a belt directly by means of the tension pulley, while providing substantially the same functions and effects as described above.

Moreover, in the above embodiments, the tension of the belt is made variable by changing in two stages the degree of expansion and contraction of the spring of an elastic material which is provided in the interior of the automatic belt tensioner. However, such a spring may not be provided inside the automatic belt tensioner but instead in the interior of the pulley unit.

In addition, the tension adjuster, which is constituted by the pulley unit and the automatic belt tensioner, sets the tension of the belt in two stages, i.e., one for engine starting, and the other for driving accessories, but it may be constructed to set the belt tension in three or more stages.

Besides, though in the above embodiments, the starter motor is used as the rotating electric machine for transmitting a starting force or power to the engine, another drive source such as a motor generator may be employed in place of the starter motor.

As described in the foregoing, a belt transmission apparatus according to the present invention includes: a rotating electric machine pulley of a rotating electric machine for transmitting starting power to an engine; an engine pulley for transmitting the starting power to the engine and also transmitting a rotation power of the engine to an accessory; an auxiliary pulley being driven to rotate by the power from the engine pulley thereby to drive the accessory; a belt wrapped around the rotating electric machine pulley, the engine pulley and the auxiliary pulley in succession; and a belt tension adjuster for urging the belt so as to set a tension of the belt in a plurality of stages. The tension adjuster acts to adjust the tension of the belt in such a manner that the belt tension is set to be greater when the engine is started by the rotating electric machine than when the accessory is driven to operate after the engine has been started. With this construction, at the time of engine starting in which a large drive torque is required, the belt tension is increased to provide a predetermined starting torque, whereas after the engine has been started, the belt tension is returned to a low tensile force necessary for driving the accessory, so that it is possible not only to improve the useful life of the belt but also to reduce the sizes or dimensions and the costs of the shaft, bearings and the support structure of the accessory.

In a preferred form of the present invention, the tension adjuster is disposed in an area in which a slack of the belt occurring when the engine is started by the rotating electric machine becomes the greatest. Thus, a predetermined belt tension is maintained in the area in which the belt is the most slack, whereby a starting force or power is transmitted from the starter motor to the engine in a reliable manner, while preventing slippage of the belt.

In another preferred form of the present invention, the tension adjuster includes a pulley unit around which the belt is wrapped whereby the pulley unit is caused to rotate in accordance with movement of the belt, and an automatic belt tensioner for urging the pulley unit to push the belt through the pulley unit. Thus, it is possible to prevent belt slips and improve the belt life with a simple construction.

In a further preferred form of the present invention, the automatic belt tensioner includes an elastically deformable spring, a push rod for urging the pulley unit with a reactive force generated upon elastic deformation of the spring, and an elastic deformation unit for elastically deforming the spring. With this arrangement, the resiliency of the spring acts to cause the belt to follow variations in its tension thereby to maintain the belt tension at a constant value. As a result, stability in the belt tension is improved.

In a still further preferred form of the present invention, the elastic deformation unit includes an electromagnetic coil, and a movable electromagnetic core adapted to be attracted by an electromagnetic attraction force developed upon energization of the electromagnetic coil thereby to push the spring. With this arrangement, it is relatively easy to control the belt tension, and the structure of the elastic deformation unit is simple.

In a yet preferred form of the present invention, the elastic deformation unit includes an electromagnetic coil, a spool adapted to be moved by an electromagnetic attraction force developed upon energization of the electromagnetic coil, a cylindrical housing having a fluid chamber into which pressure fluid is caused to flow in accordance with movement of the spool, and a piston adapted to be moved to push the spring in accordance with an increasing pressure in the fluid chamber. With this arrangement, it is possible to set the tension of the belt to a relatively large value.

In a further preferred form of the present invention, the elastic deformation unit includes a wax housing having a diaphragm chamber defined therein by a diaphragm and filled with a wax, a heater unit mounted on the wax housing and adapted to generate heat when energized, and a piston adapted to push the spring in accordance with an expansion of the wax heated by the heat generated by the heater unit. With this arrangement, the setting of the belt tension can be made with an inexpensive and simple structure.

In a further preferred form of the present invention, the elastic deformation unit includes an electric motor, a screw type position adjustment shaft adapted to be rotated by torque of the electric motor transmitted thereto, and a screw type movable disk adapted to be moved in an axial direction to push the spring in accordance with rotation of the screw type position adjustment shaft. With this arrangement, the tension of the belt can be set to a relatively large value with a simple structure.

In a further preferred form of the present invention, the belt transmission apparatus further includes a housing having the spring accommodated therein with a viscous fluid filled therein. Thus, the buffering or cushioning action of the viscous fluid serves to reduce resonance of the spring due to a force applied thereto through the push rod and caused by variations in the belt tension and its resultant varying frequency.

Preferably, the engine comprises a vehicular engine. In this case, it is possible not only to improve the useful service life of the belt in the form of a vehicular belt but also to reduce the sizes or dimensions and the costs of the shaft, bearings and its support structure of the accessory in the form of a vehicular accessory.

Preferably, the position of the push rod is set by a signal from a central processing unit which processes information comprising, at least, an rpm of the engine, an engine starting signal, a vehicle speed, and the tension of the belt. Thus, the central processing unit can efficiently make a determination about the belt tension is to be changed as well as a determination about the timing of changing the belt tension, and hence it is possible to prevent slippage of the belt and increase the life time of the belt as well.

Preferably, the rotating electric machine comprises a starter motor. In this case, a starting force or power can be supplied to the engine by the starter motor in a stable and reliable manner.

Preferably, the rotating electric machine comprises a motor generator. In this case, the engine is supplied with a starting force or power in a stable and reliable manner, and at the same time, after the engine has been started, the motor generator can supply electricity or electric power to the accessory for example.

While the invention has been described in terms of preferred embodiments, those skilled in the art will recognize that the invention can be practiced with modifications within the spirit and scope of the appended claims.

What is claimed is:

1. A belt transmission apparatus, comprising:
   a rotating electric machine pulley of a rotating electric machine for transmitting starting power to an engine;
   an engine pulley for transmitting the starting power to said engine and also transmitting a rotation power of said engine to an accessory;
   an auxiliary pulley being driven to rotate by the power from said engine pulley thereby to drive said accessory;
   a belt wrapped around said rotating electric machine pulley, said engine pulley and said auxiliary pulley in succession; and
   a belt tension adjuster for urging said belt so as to set a tension of said belt in a plurality of stages,
   wherein said tension adjuster acts to adjust the tension of the belt such that the belt tension is set to be greater when said engine is started by said rotating electric machine than when said accessory is driven to operate after said engine has been started,
   wherein said tension adjuster comprises: a pulley unit around which said belt is wrapped whereby to rotate in accordance with movement of said belt; and an automatic belt tensioner for urging said pulley unit to push said belt through said pulley unit, and
   wherein said automatic belt tensioner comprises:
   a first housing with first and second axial end walls;
   an elastically deformable spring;
   a push rod extending through the first axial end wall, for urging said pulley unit with a reactive force generated upon elastic deformation of said spring, comprising a planar disk portion having an outer diameter equivalent to an inner diameter of the housing; and
   an elastic deformation unit, for elastically deforming said spring, comprising a planar disk portion having outer diameter equivalent to an inner diameter of the housing;
   wherein the elastically deformable spring is arranged between said disk portion of said piston and said disk portion of said push rod.

2. The belt transmission apparatus according to claim 1, wherein said elastic deformation unit further comprises:
   an electromagnetic coil; and a movable electromagnetic core, including said planar disk portion, adapted to be attracted by an electromagnetic attraction force developed upon energization of said electromagnetic coil thereby to push said spring.

3. The belt transmission apparatus according to claim 1, wherein said elastic deformation unit further comprises:
a piston including said planar disk portion;
a control unit comprising an electromagnetic coil and a spool adapted to be moved by an electromagnetic attraction force developed upon energization of said electromagnetic coil, wherein:
the housing is cylindrical and comprises a fluid chamber into which pressure fluid is caused to flow in accordance with movement of said spool; and
the piston is adapted to be moved to push said spring in accordance with an increasing pressure in said fluid chamber.

4. The belt transmission apparatus according to claim 1, wherein said elastic deformation unit further comprises:
a wax housing having a diaphragm chamber defined therein by a diaphragm and filled with a wax;
a heater unit mounted on said wax housing and adapted to generate heat when energized; and
a piston, including said planar disk portion, adapted to push said spring in accordance with an expansion of said wax heated by the heat generated by said heater unit.

5. The belt transmission apparatus according to claim 1, wherein said elastic deformation unit further comprises:
an electric motor;
a position adjustment shaft adapted to be rotated by torque of said electric motor transmitted thereto; and
a movable disk, including said planar disk portion, adapted to be moved in an axial direction to push said spring in accordance with rotation of said position adjustment shaft.

6. The belt transmission apparatus according to claim 1, wherein said housing is filled with a viscous fluid.

7. A belt transmission apparatus, comprising:
a rotating electric machine pulley of a rotating electric machine for transmitting starting power to an engine;
an engine pulley for transmitting the starting power to said engine and also transmitting a rotation power of said engine to an accessory;
an auxiliary pulley being driven to rotate by the power from said engine pulley thereby to drive said accessory;
a belt wrapped around said rotating electric machine pulley, said engine pulley and said auxiliary pulley in succession; and
a belt tension adjuster for urging said belt so as to set a tension of said belt in a plurality of stages, wherein:
said tension adjuster acts to adjust the tension of the belt such that the belt tension is set to be greater when said engine is started by said rotating electric machine than when said accessory is driven to operate after said engine has been started;
said engine comprises a vehicular engine; and
the position of said tension adjuster is set by a signal from a central processing unit which processes information comprising, at least, an rpm of said engine, an engine starting signal, a vehicle speed, and the tension of said belt.

8. The belt transmission apparatus according to claim 7, wherein said rotating electric machine comprises a starter motor.

9. The belt transmission apparatus according to claim 7, wherein said rotating electric machine comprises a motor generator.

10. The belt transmission apparatus according to claim 7, further comprising a tension pulley rotatably connected to a pulley unit, wherein said pulley unit is movably connected to said engine between said tension adjuster and said belt, and said tension adjuster urges the movement of said pulley unit to adjust the tension of said belt.

11. The belt transmission apparatus according to claim 10, wherein said pulley unit is movable rotatably around an axis offset from said rotatable connection between said tension pulley and said pulley unit, and said tension pulley and said pulley unit rotate in planes generally parallel to each other.

12. A belt transmission apparatus, comprising:
an electric machine pulley rotatably connected to a rotating electric machine;
an engine pulley rotatably connected to a crankshaft of said engine;
an auxiliary pulley rotatably mounted to an accessory;
a tension pulley rotatably connected to a pulley unit,
an automatic belt tensioner connected to said pulley unit;
a belt wrapped around said electric machine pulley, said engine pulley, said auxiliary pulley and said tension pulley; wherein:
said belt transmits starting power from said rotating electric machine to said engine, and transmits rotation power of said engine to said accessory;
said pulley unit is movably connected to said engine;
said automatic belt tensioner urges the movement of said pulley unit based upon an operational condition of the engine, thereby setting a tension in said belt that is greater when said engine is started by said rotating electric machine than when said engine is running and said belt is transmitting rotation power to said accessory, and
said automatic belt tensioner comprises:
a first cylindrical housing with first and second axial end walls;
a piston, which is axially movable within said cylindrical housing, comprising a planar disk portion having an outer diameter equivalent to an inner diameter of the cylindrical housing;
a push rod, which is axially movable within said cylindrical housing and extends through one of said axial end walls to contact said pulley unit, comprising a planar disk portion having an outer diameter equivalent to an inner diameter of the cylindrical housing;
a first elastically deformable spring arranged between said disk portion of said piston and said disk portion of said push rod; and
a control unit that axially moves said piston.

13. The belt transmission apparatus according to claim 12, wherein said pulley unit is movable rotatably around an axis offset from said rotatable connection between said tension pulley and said pulley unit, and said tension pulley and said pulley unit rotate in planes generally parallel to each other.

14. The belt transmission apparatus according to claim 12, wherein said control unit comprises:
a second cylindrical housing;
an electromagnetic coil;
a spool axially movable within said cylindrical housing and shaped to form fluid chambers in conjunction with said cylindrical housing;

a second elastically deformable spring arranged between said electromagnetic coil and said spool; wherein said spool is axially movable to a first position by an electromagnetic attraction force developed upon energization of said electromagnetic coil;

when said spool is moved to said first position, a flow of pressurized fluid is allowed to pass through said control unit and into a pressure oil chamber of said automatic belt tensioner defined by said first cylindrical housing and said piston to thereby axially move said piston and said push rod toward said pulley unit, and raise the tension in said belt.

15. The belt transmission apparatus according to claim 14, wherein:

the spool comprises an axially extending rod and a plurality of radially extending lands having outer diameters equal to an inner diameter of the second cylindrical housing;

the rod of the spool extends into the electromagnetic coil;

the radially extending lands open inflow and outflow ports arranged on lateral sides of the second cylindrical housing.

16. The belt transmission apparatus according to claim 14, wherein said spool is axially movable to a second position by said second elastically deformable spring upon de-energization of said electromagnetic coil;

said second position allowing the flow of fluid from said pressure oil chamber to a holding tank to thereby allow the axial movement of said piston and said push rod away from said pulley unit, and lower the tension in said belt.

17. The belt transmission apparatus according to claim 12, wherein:

said piston further comprises a rod portion extending orthogonally from the center of said disk portion of said piston towards said push rod;

said push rod further comprises a cylindrical portion extending orthogonally from the center of said disk portion of said push rod towards said piston; and said cylindrical portion of said push rod is hollow and said rod portion of said piston extends therein.

18. The belt transmission apparatus according to claim 17, wherein said first elastically deformable spring is a coil spring arranged so that it surrounds said cylindrical portion of said push rod and said rod portion of said piston.

19. The belt transmission apparatus according to claim 12, wherein the first axial end wall of the cylindrical housing comprises:

a cover housing secured to an end face of the cylindrical housing near the push rod in a fluid tight manner comprising a push rod hole axially centered therein; and a slide bearing and seal fitted in an axially inner side of the push rod hole to interface with the push rod.

20. The belt transmission apparatus according to claim 19, wherein a supply and discharge port for pressure oil is formed through the second axial end wall near the piston, and a drain port is formed through a side surface of the cylindrical housing near the cover housing.

21. The belt transmission apparatus according to claim 12, wherein said disk portion of said piston and said disk portion of said push rod have the same diameter.

22. The belt transmission apparatus according to claim 12, wherein the first cylindrical housing is fluid-tight.

23. An automatic belt tensioner for use in an engine belt transmission apparatus, comprising:

a first cylindrical housing with first and second axial end walls;

a piston, which is axially movable within said cylindrical housing, comprising a planar disk portion having an outer diameter equivalent to an inner diameter of the cylindrical housing;

a push rod, which is axially movable within said cylindrical housing and extends through one of said axial end walls to contact a tensioner to tension a belt on the vehicular engine, comprising a planar disk portion having an outer diameter equivalent to an inner diameter of the cylindrical housing;

a first elastically deformable spring arranged between said disk portion of said piston and said disk portion of said push rod; and a control unit that axially moves said piston.

* * * * *